UNITED STATES PATENT OFFICE.

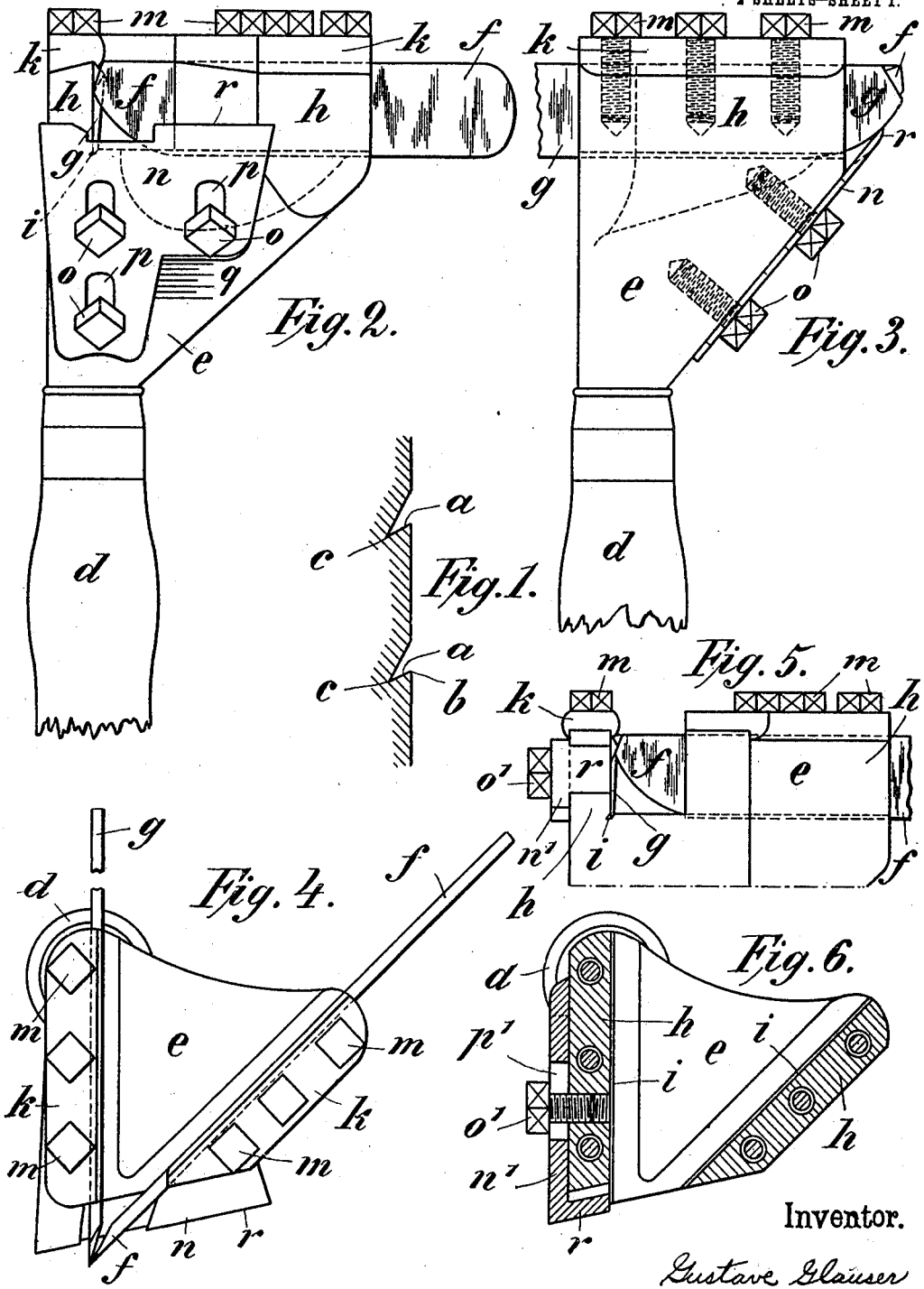

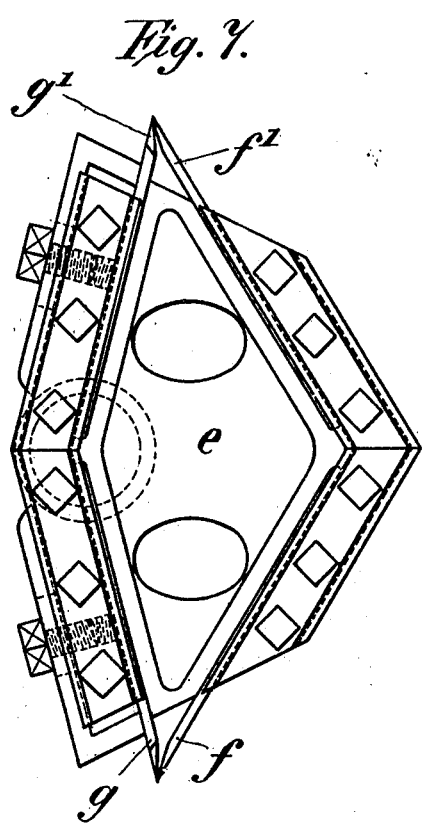

GUSTAVE GLAUSER, OF GIRARDOT, COLOMBIA, ASSIGNOR TO FERD. ESSER & CO., OF HAMBURG, GERMANY.

IMPLEMENT FOR TAPPING TREES.

978,366.  Specification of Letters Patent.  Patented Dec. 13, 1910.

Application filed March 1, 1909. Serial No. 480,727.

*To all whom it may concern:*

Be it known that I, GUSTAVE GLAUSER, a Swiss citizen, residing in Girardot, Republic of Colombia, have invented new and useful Improvements in Implements for Tapping Trees, of which the following is a specification.

The present invention relates to an implement used for tapping or boxing trees, *i. e.* for making incisions in the bark at an angle to a horizontal line, so as to open the milk- or latex-tubes and allow the juice or sap to run out. With this object heretofore either ordinary knives or a special kind of implement has been used, the cutting blades of which are bent in the shape of a V or U. In order to prevent waste of the caoutchouc latex or other juice as the case may be it has for some time been usual to so direct the flow of the juice as to cause it to run down the channel formed by the incision without flowing over the outer rim of the channel to the prescribed point where it is allowed to run into a receptacle held or fixed to the tree. The incision therefore must be effected in such a way that the channel has a cross-section such as is shown in Figure 1 of the accompanying drawings, that is to say the bottom $a$ of the channel should slope downward from outside to inside so that the outer rim $b$ is higher than the apex $c$ of the channel. In producing a channel of this description it is necessary when making use of a common more or less pointed knife to make two cuts in the bark. This means carrying out twice an operation which should be only done once. Moreover it has the drawback that the juice starts to run out as soon as the first incision is made. It is also very difficult when making the second cut to hold the knife so steadily that the channel to any degree attains an equal cross-section throughout and it frequently happens that too much of the bark is cut away. By the aid of implements the blades of which are V- or U-shaped it is true channels can be produced by a single incision, however it is almost impossible to do this to such perfection that the channel has a cross-section such as shown in Fig. 1 throughout, because the implement must be held at a very acute angle. There is a tendency for the cutting tool to rise into an upright position and therefore the lower cutting surface will, instead of sloping down inwardly, be more or less horizontal or even to some degree sloping in the opposite direction.

The object of the present invention is to do away with these disadvantages and to construct a cutting implement by the aid of which it is easy to cut channels with an equal cross-section, such as shown in Fig. 1, throughout. To this end the implement is provided with a guiding surface which bears against the tree when the incision is made. The tool has two blades arranged at an acute angle to one another and also at acute angles to the said guiding surface. These blades, which may be made of two steel bars, are provided with cutting edges at the front end and are detachably fastened to a block or frame fixed to a handle. The blades can be easily removed and the cutting edges ground. It is scarcely possible to sharpen the tapping implements which are at present known. Yet it is of the greatest importance that the cutter should be as sharp as a razor. If it is blunt or the cut is made with a knife having a jagged edge the ends of the newly cut milk-tubes will be squeezed and torn and the openings clogged so that the juice inside these tubes cannot all run out.

In the aforesaid drawings:—Fig. 1 is a detail section showing the form of the channels cut by my tapping implement. Fig. 2 is an elevation of a tapping implement constructed according to this invention. Fig. 3 is a second elevation showing the implement turned around an angle of 90°, the handle being partly broken away. Fig. 4 is an end view of the same. Fig. 5 shows the upper part of a modification of the improved implement in elevation, and Fig. 6 a horizontal section of the same the cutting-blades being removed. Fig. 7 is an end view of a tapping implement, which may be used for cutting from right to left as well as from left to right.

The implement shown in Figs. 2 to 6 of the drawings consists of a block or frame $e$ carrying two independent cutting blades $f$ and $g$ and provided with a handle $d$ arranged at right angles to the longitudinal edges of the blades and parallel to the cutting line and by which handle the implement is held when tapping. The frame has two side walls $h$ so arranged that the blades $f$ and $g$ held thereto will converge to a point outside of the frame $e$. In the frame close to each side wall thereof is formed a groove $i$ into which the lower longitudinal edge of the blade is placed. A cover $k$ bears against the upper longitudinal edge of the blade which cover is fastened to the top of the side wall $h$ by screws $m$ of sufficient strength to press the blade tightly into the groove $i$ so as to secure a firm hold. The blades are ground at their front end so as to obtain sharp cutting pointed edges, which converge to a common point, the implement being viewed from above (Fig. 4), and which however may be separate for a short distance, when looking at the implement from the side (Fig. 3), that is to say, the knives converge toward their cutting edges in a line formed by the intersection of the planes of the knives, the points of the same lying in this line at a distance apart. Moreover, as may be seen in Fig. 3, the cutting edge of each knife is so shaped or curved as to form at its point a very acute angle with the said line of intersection and to gradually turn toward the handle.

In the implement as shown in Figs. 2 to 4 a plate $n$ is adjustably attached to the front part of the frame $e$, the upper edge $r$ forming a guiding surface which is adapted to bear or press against the tree when an incision is being effected. This plate may be attached by means of set screws $o$ which project through slots $p$ in the plate when screwed into the frame $e$. The plate $n$ will be adjusted high or low in accordance with the depth of the incision it is desired to make into the bark of a tree. Division lines $q$ may be drawn on the outer face of the frame $e$ close to the plate $n$ to accurately adjust the latter according to the desired depth of the incision.

By the aid of a tapping tool as described above there is no difficulty in making in the bark of a tree incisions which have throughout a cross-section as shown in Fig. 1. The frame $e$ which within reasonable limits may be of considerable weight aids to steady the hand in making an incision by a clean uniform cut.

In the modification shown in Figs. 5 and 6 the guiding surface $r$ is arranged on a lateral projection of a bar $n^1$ adjustably attached by a screw $o^1$ to the frame parallel to the cutting blade $g$ the screw $o^1$ projecting through a slot $p^1$ in the bar $n^1$. The said projection may be of any desired length sufficient to serve as a guide when held against the bark of the tree to be tapped. Division lines (not shown) may be made on the side of the frame $e$ adjacent to the bar $n^1$ for the same purpose as described with reference to the implement shown in Figs. 2 to 4.

Instead of being arranged as shown in Figs. 2 to 6 the guide-surface may be arranged higher or lower or more to one side or on both sides of the cutting blades so long as this surface allows of the implement steadily bearing against the bark of the tree when performing the cutting operation.

It is of importance that the blades project in front of the guiding surface or guiding line of such surface in such a manner that both blades stand at an angle to the said surface or line, which angle if taken to lie on the same side, is less than 90°. Only when this is the case is it possible to hold the implement by aid of the guiding line or surface in proper relation to the tree so as to secure the forming of an absolutely uniform channel of a cross section as shown in Fig. 1. It should be understood that the guiding-surface need not be of considerable breadth since even a practically mathematical line would be sufficient to steady the implement in the desired manner.

The consequence of the peculiar arrangement of the cutting blades on the frame is that an implement as shown in Figs. 2 to 4 or 5 to 6 can only be used to cut in one direction. Should it be desired to cut from right to left downward as well as from left to right downward two implements are necessary of which one is right handed and the other left handed. However it may be advantageous to combine both into one single tool. An end view of such a double-tool is shown in Fig. 7, in which the frame is formed with four side walls, in such a manner that two pairs of tools may be attached symmetrically to the same.

It will be easily understood that by means of this implement it is not only possible to make incisions from right to left and from left to right downward but also to cut upward in both directions and to form prolongations of the incision cut downward at places where it is inconvenient or impossible to cut downward with the implement shown in Figs. 2 to 6 for instance at the foot of the tree.

I claim:

In a tapping implement a frame, two cutting blades attached to the frame in a position to form an acute angle to one another, the cutting edges being arranged at their place of junction and a guiding surface, beyond which the blades project and adapted to guide the implement at an angle to the surface to be cut, a second pair of cutting blades attached to the frame in a position symmetrical to the first named cutting blades and a second guiding surface symmetrically positioned on the frame with regard to the first named guiding surface.

GUSTAVE GLAUSER.

Witnesses:
JAMES WHILDIN REEVES,
OCTAVIO SAYER.